United States Patent Office 3,436,718
Patented Apr. 1, 1969

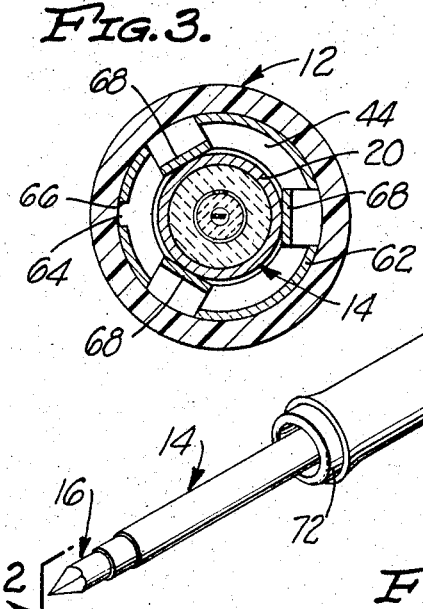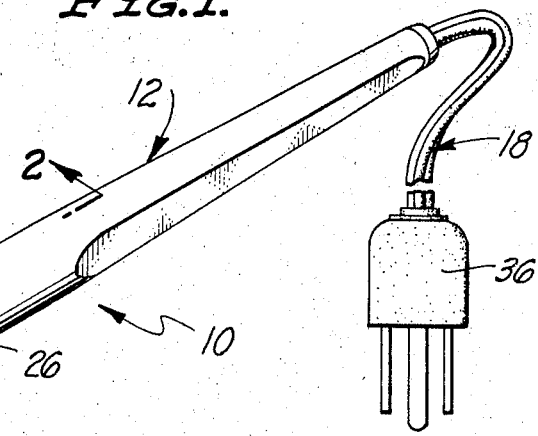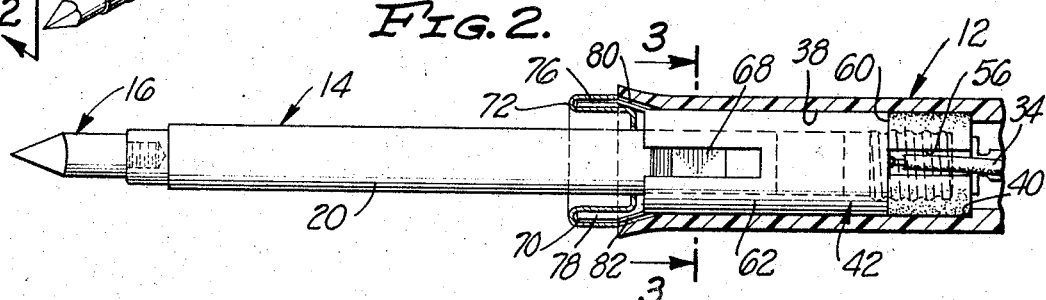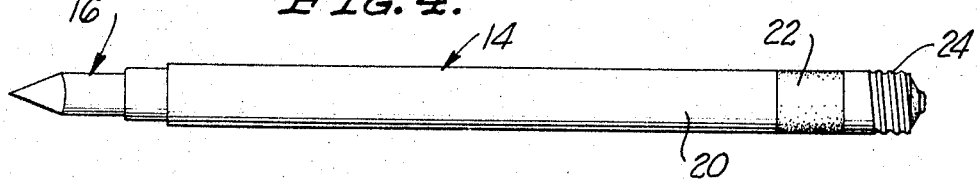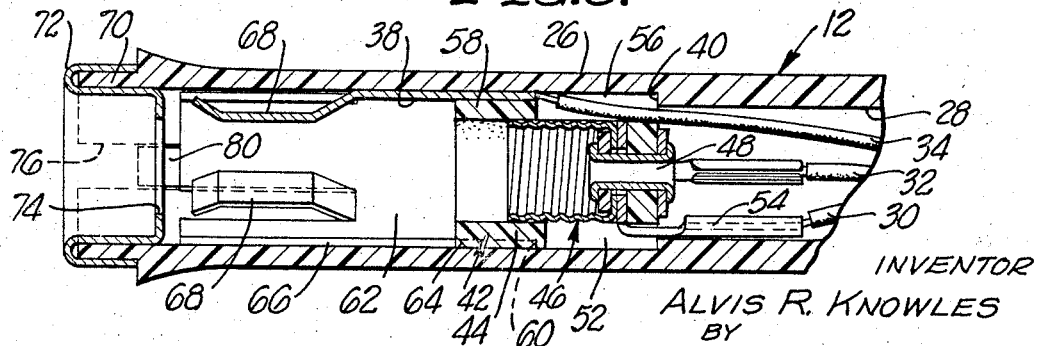

3,436,718
HANDLE FOR ELECTRIC SOLDERING IRON
Alvis R. Knowles, Torrance, Calif., assignor to Eldon Industries, Inc., Hawthorne, Calif., a corporation of California
Filed May 31, 1966, Ser. No. 554,059
Int. Cl. H01r 7/30
U.S. Cl. 339—110                          8 Claims

ABSTRACT OF THE DISCLOSURE

A soldering iron has an electric heating element removable from an electrical socket within the tubular handle. The socket is mounted in a socket support retained within one end of the handle by a tubular socket retainer fixed in the handle. The socket retainer extends forwardly in the handle and provides supporting fingers to support and guide the heating element. An electrical conductor connected to the retainer extends outwardly through the other end of the handle to provide a grounding connection for the heating element supported in the fingers. The retainer prevents both forward and rotary movement of the socket support.

BACKGROUND

Electric soldering irons are well known. Furthermore, the prior art includes electric soldering irons wherein the heating element is screwed into a socket in the handle. In the prior art, however, socket retention has been poor so that unscrewing or withdrawing of the heating element tends to loosen the socket, particularly in those cases where a soldering iron is old and the socket is loosely fitted.

DESCRIPTION

Thus, it is an object of this invention to provide a soldering iron which has firm and sturdy socket retention both with respect to axial withdrawing force and with respect to rotational unscrewing force. It is another object of this invention to provide a socket retainer which has guide fingers in engagement with the metallic exterior of the heating element so as to provide electrical continuity and to provide grounding means for the socket retainer. Other objects and advantages of this invention will become apparent from a study of the following portion of this specification, the claims and the attached drawings.

FIG. 1 is an isometric view of the soldering iron of this invention.

FIG. 2 is an enlarged section taken generally along the line 2—2 of FIG. 1.

FIG. 3 is a further enlarged section taken generally along the line 3—3 of FIG. 2.

FIG. 4 is a side elevational view of the heating element and soldering tip of the soldering iron of this invention.

FIG. 5 is a further enlarged, partial longitudinal section of the sodering iron of this invention particularly showing the details of the socket retaining structure.

Referring now to the drawings, the soldering iron of this invention is generally indicated at 10. The soldering iron 10 comprises handle 12, heating element 14, tip 16 and cord 18.

Tip 16 is usually solid metallic and made of copper, or other construction which is plated, and is screwed into the front end of heating element 14. Heating element 14 has a heat conductive core which conducts the heat to the tip 16 and has a metallic exterior shell 20 which is insulated at 22, see FIG. 4, from screw plug 24. So much of this soldering iron 10 is conventional.

Handle 12 has generally cylindrical exterior surface 26 and an interior bore 28, thus making it generally tubular. The bore 28 is of sufficient size for passage of wires 30, 32 and 34 and which extend interiorly of the handle 12 to become cord 18. Cord 18 carries a standard plug 36 for plugging into receptacles to supply electricity to the soldering iron 10. Interiorly of handle 12, bore 38 is provided. Bore 38 is larger than bore 28 and joins it at shoulder 40.

Socket assembly 42 is mounted within bore 38. Socket assembly 42 comprises socket support 44 which is tubular and has socket 46 therein. Socket 46 is conventional, and has a central rivet 48 which provides electrical contact from the point of screw plug 24 to wire 32. Furthermore, its screw socket portion 50 is electrically connected to wire 30. To permit assembly, slot 52 in side of socket support 42 permits passage of fitting 54. Furthermore, slot 56 permits passage of wire 34.

Socket support 44 has a section of reduced outer diameter to define boss 58 and shoulder 60. Socket retainer 62 is generally tubular and fits within bore 38, over boss 58 and against shoulder 60. Boss 58 has the key 64 extending therefrom. Slot 66 in socket retainer 62 engages over key 64 to prevent relative rotation of socket support 44 and socket retainer 62. Wire 34 extends to socket retainer 62 and is secured thereto as by soldering so as to provide a ground wire for the socket retainer 62. Socket retainer 62 carries three resilient fingers 68 which engage with the metallic exterior shell 20 of heating element 14, when the heating element is screwed into socket 46. Thus, electrical continuity is provided between the exterior of the heating element and ground wire 34. As desired, ground wire 34 can be carried to any convenient ground such as through the ground plug 36.

Handle 20 extends forward to terminate in tube 70. Tube 70 carries handle cap 72 which provides strength to the forward end of the handle 12. Furthermore, its interior bore 74 serves as a guide for heating element 14 when it is inserted. Tube 70 has slots 76 and 78 therein, which slots extend from bore 38 interiorly of handle cap 72. Fingers 80 and 82 are formed on the front end of socket retainer 62 and extend into these slots. Handle cap 72 engages on the interior of these fingers and maintains them in the slots. Thus, socket retainer 62 is axially and rotatively maintained in place with respect to the main handle tube structure.

Shoulder 40 restrains socket support 44 from rearward movement. Socket retainer 62 engages against shoulder 60 and fingers 80 and 82 are engaged behind handle cap 72 to restrain socket support 44 from leftward movement. Furthermore as viewed in FIG. 5, the engagement of fingers 80 and 82 in slots 76 and 78, together with the engagement of key 64 in slot 66 restrains socket support 44 from relative rotation with respect to the main portion of the handle. Thus, structure of rigidity and long life is created, for the socket and its support are firmly fixed in place within the handle.

This application having been described in its preferred embodiment, it is clear that the soldering iron of this invention is susceptible to numerous modifications and changes within the ability of those skilled in the art without the exercise of the inventive faculty. Accordingly, the scope of this invention is defined by the scope of the following claims.

I claim:
1. A soldering iron handle structure which includes:
 a tubular handle having a normally open end;
 a socket support located within and against said tubular handle;

a socket located within and held by said socket support;

a tubular socket retainer located within said handle generally between said end and said socket support;

said socket retainer fitting against said socket support so as to hold said socket support against longitudinal movement within said handle;

interlocking means located on said socket support and said socket retainer for preventing rotation between said socket support and said socket retainer, said interlocking means on said socket support and said socket retainer being in engagement;

holding means for holding said socket retainer within said handle.

2. A soldering iron handle structure as claimed in claim 1 wherein:

said tubular socket retainer includes resilient means extending therefrom towards the interior of said retainer and of said handle;

said resilient means being adapted to engage and to aid in supporting a heating element held by said socket.

3. A soldering iron handle structure as claimed in claim 1 wherein:

said interlocking means comprises a key formed on said socket support and a slot in said socket retainer, said key fitting within said slot.

4. A soldering iron handle structure as claimed in claim 1 wherein:

said holding means including slot means formed on said handle adjacent to said end and finger means formed on said socket retainer said finger means fitting within said slot means.

5. A soldering iron handle structure as claimed in claim 4 including:

cap means fitting over and secured to said end of said handle;

said cap means engaging said finger means so as to hold said finger means within said slot means.

6. A soldering iron handle structure as claimed in claim 1 wherein:

said socket retainer is of metal and said handle is of an electrically nonconductive material and, including two electric wire means connected to said socket and an electric wire means connected to said socket retainer, all of said wire means extending from the end of said handle remote from said open end.

7. A soldering iron handle structure as claimed in claim 6 wherein:

said tubular socket retainer includes resilient means extending therefrom towards the interior of said retainer and of said handle;

said resilient means being adapted to engage and to aid in supporting a heating element held by said socket.

8. A soldering iron handle structure as claimed in claim 1 wherein:

said tubular socket retainer includes resilient means extending therefrom towards the interior of said retainer and of said handle;

said resilient means being adapted to engage and to aid in supporting a heating element held by said socket;

said interlocking means comprise a key formed on said socket support and a slot in said socket retainer, said key fitting within said slot;

said holding means including slot means formed on said handle adjacent to said open end and finger means formed on said socket retainer, said finger means fitting within said slot means;

and including cap means fitting over and secured to said open end of said handle;

said cap means engaging said finger means so as to hold said finger means within said slot means;

and wherein said socket retainer is of metal and said handle is of an electrically nonconductive material and including two electric wire means connected to said socket and an electric wire means connected to said socket retainer, all of said wire means extending from the end of said handle remote from said open end.

References Cited
UNITED STATES PATENTS

| | | | |
|---|---|---|---|
| 1,476,036 | 12/1923 | Benjamin | 339—108 |
| 1,700,167 | 1/1929 | Kollath | 339—110 X |
| 2,225,391 | 12/1940 | Pierce | 240—54 |
| 2,488,477 | 11/1949 | Rapaport | 219—240 |
| 2,997,684 | 8/1961 | Cole. | |
| 3,105,135 | 9/1963 | Finch | 219—237 X |

ANTHONY BARTIS, *Primary Examiner.*

U.S. Cl. X.R.

219—240, 237, 541; 240—54; 339—58

UNITED STATES PATENT OFFICE
CERTIFICATE OF CORRECTION

Patent No. 3,436,718 April 1, 19

Alvis R. Knowles

It is certified that error appears in the above identified patent and that said Letters Patent are hereby corrected as shown below:

Column 2, line 52, cancel "as viewed in FIG. 5" and insert the same in same line 52, after "movement".

Signed and sealed this 14th day of April 1970.

(SEAL)
Attest:

Edward M. Fletcher, Jr.            WILLIAM E. SCHUYLER, JR
Attesting Officer            Commissioner of Patents